(12) United States Patent
Caicedo Fernández et al.

(10) Patent No.: US 9,245,426 B2
(45) Date of Patent: Jan. 26, 2016

(54) CONTROL OF LIGHTING DEVICES (71) Applicant: KONINKLIJKE PHILIPS N.V., Eindhoven (NL)

(72) Inventors: David Ricardo Caicedo Fernández, Eindhoven (NL); Willem Franke Pasveer, Dordrecht (NL); Jelena Matovina, Eindhoven (NL); Michel Albertus Theodorus Klein Swormink, Eindhoven (NL); Jurgen Mario Vangeel, Beerse (BE); Roger Peter Anna Delnoij, Lommel (BE); Wijnand Johannes Rietman, Eindhoven (NL); Ashish Vijay Pandharipande, Eindhoven (NL); Biju Kumar Sreedharan Nair, Veldhoven (NL); Geert Bart Neuttiens, Hillegem (BE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/386,596

(22) PCT Filed: Mar. 13, 2013

(86) PCT No.: PCT/IB2013/051971
§ 371 (c)(1),
(2) Date: Sep. 19, 2014

(87) PCT Pub. No.: WO2013/140303
PCT Pub. Date: Sep. 26, 2013

(65) Prior Publication Data
US 2015/0048954 A1   Feb. 19, 2015

Related U.S. Application Data (60) Provisional application No. 61/613,135, filed on Mar. 20, 2012.

(51) Int. Cl.
*G09F 9/33* (2006.01)
*G08B 5/36* (2006.01)
(Continued)

(52) U.S. Cl.
CPC ........ *G08B 5/36* (2013.01); *G08C 15/06* (2013.01); *G08C 23/02* (2013.01); *H04W 84/18* (2013.01)

(58) Field of Classification Search
CPC ........ G08B 5/36; G08B 13/0205; G08B 5/22; G08B 13/184; G08B 13/186; G08C 15/06; G08C 23/02; H04W 84/18; H05B 37/02; H05B 37/0227
USPC ................ 340/815.45, 815.4, 815.5, 815.54, 340/815.57, 815.49, 551–557, 541, 567, 340/561; 250/221, 227.14; 315/297
See application file for complete search history.

(56) References Cited

U.S. PATENT DOCUMENTS 5,194,847 A * 3/1993 Taylor .................. G01H 9/004
                                                        340/541
6,414,955 B1   7/2002 Clare et al.
(Continued)

FOREIGN PATENT DOCUMENTS

WO   2008088737 A2   7/2008

OTHER PUBLICATIONS

Wendong Xiao et al; "A Prototype Ultrasonic Sensor Network for Tracking of Moving Targets", 2006 1st IEEE Conf on Industrial Electronics and Applications, Singapore, May 1, 2006, pp. 1-6, XP031026716.

(Continued)

*Primary Examiner* — Anh V La
(74) *Attorney, Agent, or Firm* — Meenakshy Chakravorty (57) ABSTRACT

A network of active sensors in a control system is considered. The active sensors, which may be fixed-infrastructure sensors, provide presence detection information to a distributed lighting system. The active sensors communicate by transmitting probe signals. The communication of probe signals may result in cross-interference which may vary in time. Cross-interference is detected, and can later be avoided, by determining a difference between signals received in a first part of a timeslot and signals received in a second part of the timeslot. In order to do so probe signals comprising two non-zero pulses are transmitted in respective parts of the timeslot. Applications are, for example, active presence sensors in lighting control applications in indoor as well as outdoor environments.

15 Claims, 5 Drawing Sheets

(51) Int. Cl.
*G08C 15/06* (2006.01)
*G08C 23/02* (2006.01)
*H04W 84/18* (2009.01)

(56) References Cited

U.S. PATENT DOCUMENTS 6,933,845 B2 * 8/2005 Howard ............... G08B 13/184
250/221
2010/0117830 A1 * 5/2010 Strong ................. G08B 13/186
340/555
2011/0274141 A1 * 11/2011 Jantunen .............. H04B 1/7183
375/138

OTHER PUBLICATIONS

Wen-Dong Xiao; Sensor Scheduling for Target Tracking in Networks of Active Sensors, ACTA Automatica Sinica, vol. 32, No. 6, Nov. 2006, pp. 922-928.

* cited by examiner

CONTROL OF LIGHTING DEVICES

CROSS-REFERENCE TO PRIOR APPLICATIONS

This application is the U.S. National Phase application under 35 U.S.C. §371 of International Application No. PCT/032013/051971, filed on Mar. 13, 2013, which claims the benefit of U.S. Provisional Patent Application No. 61/613,135, filed on Mar. 20, 2012. These applications are hereby incorporated by reference herein.

FIELD OF THE INVENTION

The present invention generally relates to the field of control systems, and in particular to a control system comprising a first active sensor and a second active sensor and methods corresponding thereto.

BACKGROUND OF THE INVENTION

Office lighting constitutes almost 30% of the electrical consumption in buildings. As the cost and energy efficiency of light-emitting-diode (LED) light sources improve, they are becoming viable alternatives for fluorescent lamps, further offering the advantage of color control. It is recognized that lighting control strategies based on occupant presence information are very effective in reducing energy consumption. For example, in unoccupied areas the illumination may be dimmed or extinguished. Hence the design of green buildings may benefit from presence-adaptive lighting control systems.

It is known that active sensors, such as ultrasound based sensors, provide better detection than passive infrared sensors in large volumetric spaces. In larger physical areas, it is commonplace to have multiple active presence sensors for proper detection coverage. It is further known that generally active sensors are more sensitive than passive infrared sensors. An ultrasonic array sensor has been described in WO 2011/151796 A1 for reliable presence sensing that, when interfaced with a lighting control system, provides reliable illumination rendering.

In "Sensor Scheduling for Target Tracking in Networks of Active Sensors," Acta Automatica Sinica, November 2006, by Xiao et al. it is noted that one issue with wireless sensor networks of active sensors is the inter-sensor interference when nearby ultrasonic sensors work simultaneously. Such interference may result in sensor detection errors and should be dealt with properly. Inter-sensor interference also introduces technological constraints in design and implementation of wireless sensor networks. Sensor scheduling is used to avoid inter-sensor interference and implement collaboration between sensors. The network is synchronized and the time is divided into timeslots. The period for each slot should be larger than the die-out time of the ultrasonic wave in a ranging operation. In this paper, to avoid inter-sensor interference, sensors are scheduled such that during any timeslot only one sensor in an inter-sensor interference region can sense the target.

SUMMARY OF THE INVENTION

It has been discovered that cross-interference across active sensors (such as sensors based on ultrasound, or radio frequency) is a problem in indoor as well as outdoor sensing applications. Cross-interference across active sensors generally depends on the dimensions of the monitored space and presence/absence of objects therein. For instance, when an object is moved (or added/removed) the cross-interference pattern across sensors tends to vary. This affects proper operation of the presence sensing systems.

When presence sensing systems are deployed, it may be necessary to avoid potential cross-interference across active transmissions. The presence sensing system as a whole needs to function properly, with each individual presence sensor being able to determine presence-related information in its coverage area. It is an object of the present invention to overcome these problems, and to provide a control system comprising a number of active sensors that are arranged to detect, mitigate and use the cross-interference to improve the system performance.

According to a first aspect of the invention, the above and other objectives are achieved by a control system, comprising a first active sensor comprising a transmitter arranged to in a first timeslot transmit a first probe signal comprising two non-zero pulses transmitted in respective parts of the first timeslot; and a second active sensor comprising a receiving sensor array arranged to receive the first probe signal; and a processing unit arranged to, in a second timeslot, determine a difference between signals received in a first part of the second timeslot and signals received in a second part of the second timeslot, the processing unit thereby being arranged to detect interference.

Advantageously the first aspect allows for detection of cross-interference, particularly in varying environments. The cross-interference may vary in time, inter alia due to addition, removal, or moving of objects placed between the active sensors of the control system. Advantageously this may enable improvement in performance of presence detection.

Advantageously the second active sensor is able to detect interference without needing to transmit a probe signal of its own.

According to embodiments the second active sensor further comprises a transmitter arranged to in the second timeslot transmit a second probe signal comprising two non-zero pulses transmitted in respective parts of the second timeslot, wherein the receiving sensor array further is arranged to receive an echo of the second probe signal, and wherein the processing unit, by determine the difference, thereby being arranged to cancel the two non-zero pulses of the second probe signal.

Advantageously this leads to further improved detection of cross-correlation since also the second active sensor transmits a probe signal, the echo of which being used during assessment of presence of any cross-correlation.

According to embodiments the second active sensor further comprises a transmitter arranged to in the second timeslot and in response to the receiving sensor array receiving the first probe signal transmit an announcing signal pertaining to the second active sensor being added to the control system, and wherein the first active sensor further comprises a receiving sensor array arranged to receive the announcing signal.

A new active sensor (in the claim language: the second active sensor) may thereby be added to an existing control system already comprising one or more active sensors (in the claim language: the first active sensor). The detected cross-interference may thereby facilitate the addition of a new active sensor into the control system.

According to a second aspect of the invention, the objective is achieved by a method of detecting interference in a control system, comprising transmitting, by a first active sensor, in a first timeslot a first probe signal comprising two non-zero pulses transmitted in respective parts of the first timeslot; receiving, by a second active sensor, the first probe signal; and determining, by the second active sensor, in a second timeslot a difference between signals received in a first part of the second timeslot and signals received in a second part of the second timeslot, the second active sensor thereby being arranged to detect interference.

It is noted that the invention relates to all possible combinations of features recited in the claims. Likewise, the advantages of the first aspect applies to the second aspect, and vice versa.

BRIEF DESCRIPTION OF THE DRAWINGS

The above and other aspects of the present invention will now be described in more detail, with reference to the appended drawings showing embodiment(s) of the invention.

DETAILED DESCRIPTION

The below embodiments are provided by way of example so that this disclosure will be thorough and complete, and will fully convey the scope of the invention to those skilled in the art. Like numbers refer to like elements throughout. The devices disclosed in the below embodiments will be described in an operation context of the system.

Embodiments of the present invention may be applied to improvements of localized lighting rendering in a location with a fixed sensor infrastructure.

In periodic sensor scheduling, according to "Sensor Scheduling for Target Tracking in Networks of Active Sensors," Acta Automatica Sinica, November 2006, by Xiao et al., the time is divided into periodic cycles, and in each cycle, a sensor senses the target alternatively within the predefined timeslots assigned to it. If a scheduled sensor detects the target, it will calculate the time difference between its current measurement time and the time of the previous time step, then fuse its measurement with the existing target estimation using an extended Kalman filter approach, and forward this new estimation update together with its measurement time to the next scheduled sensor.

In adaptive sensor scheduling, according to "Sensor Scheduling for Target Tracking in Networks of Active Sensors," Acta Automatica Sinica, November 2006, by Xiao et al., the next tasking sensor for the next time step is scheduled according to predicted tracking accuracy which is derived from the trace of the covariance matrix of the state estimation. It is therefore conditioned that each sensor knows the measurement characteristic of the other sensors (such as their locations, orientations and measurement functions). Using the extended Kalman filter approach, the current sensor can calculate the predicted covariance matrix for any other sensor without the real measurement is taken using that sensor. The sensor with the best tracking accuracy is selected as the next tasking sensor. Then the current sensor shall forward its own measurement time and estimation result to the selected sensor.

However, "Sensor Scheduling for Target Tracking in Networks of Active Sensors," Acta Automatica Sinica, November 2006, by Xiao et al. does not mention how to detect cross-interference or how to deal with cross-interference once detected. Embodiments of the present invention will be disclosed with respect to an ultrasonic sensor modality, although the embodiments may likewise be applied to other active sensors, such as radars and multi-modal sensors. It is further assumed that the ultrasound array sensors are fixed, for example in the lighting infrastructure of a room. However, as the skilled person understands, the ultrasound array sensors may be separated from the lighting infrastructure.

Figure 1:
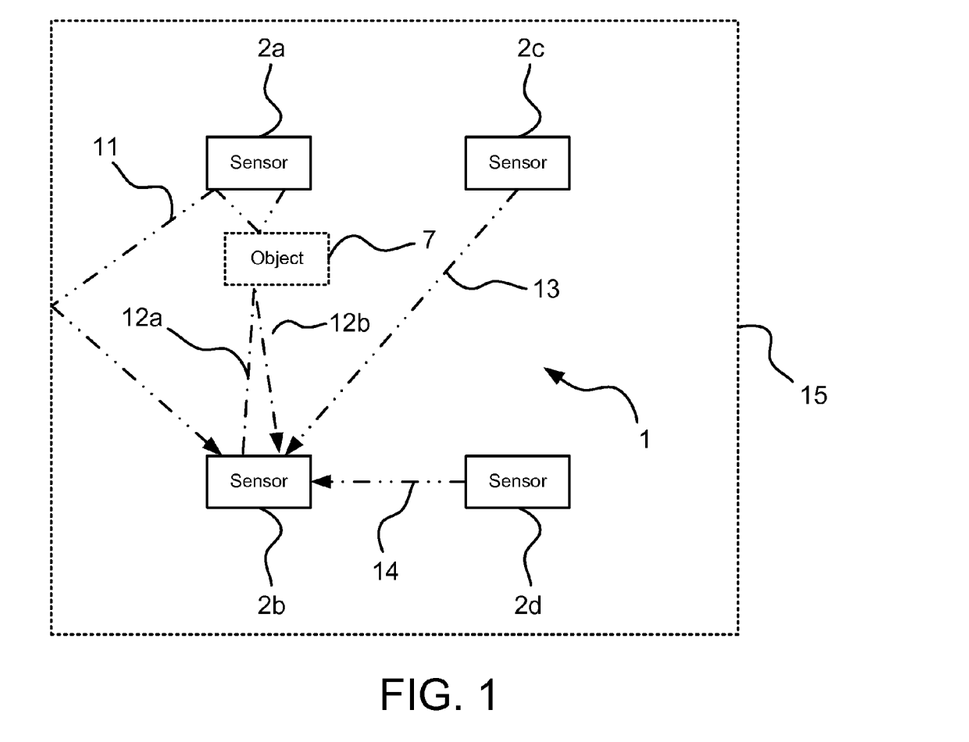
FIG. 1 illustrates a control system according to embodiments.

FIG. 1 schematically illustrates a control system 1 according to the present invention. The control system 1 is according to the schematic example of FIG. 1 placed in a room, the inner walls of which are denoted by reference numeral 15. Typically the room is a room of a building. The control system 1 comprises a number of active sensors $2a$, $2b$, $2c$, $2d$, one of which herein is denoted as a first active sensor, for example sensor $2a$, another of which herein is denoted a second active sensor, for example sensor $2b$, another of which herein is denoted a third active sensor, for example sensor $2c$, and another of which herein is denoted a fourth active sensor, for example sensor $2d$. Generally, the control system 1 comprises at least two active sensors but may in general comprise a plurality of active sensors. An object 7 symbolizes a static object present in the room. For example, when the room is an office the object 7 may be a desk. The control system 1 may further comprise at least one light source (not shown), other sensors, etc.

Figure 2:
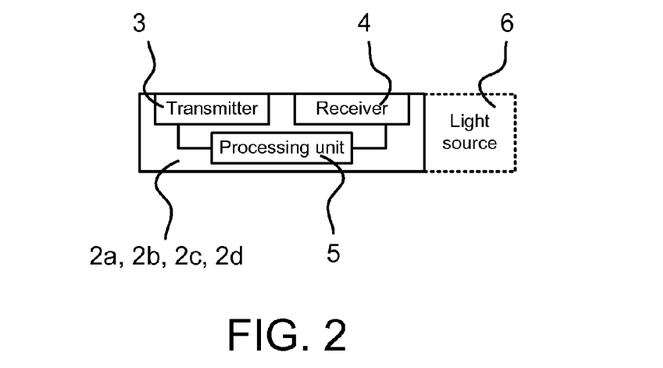
FIG. 2 illustrates an active sensor according to embodiments.

FIG. 2 illustrates an active sensor $2a$, $2b$, $2c$, $2d$ according to embodiments of the present invention. In general, the active sensor $2a$, $2b$, $2c$, $2d$ may comprise a transmitter 3, a receiver 4, and a processing unit 5. The receiver 4 is preferably a receiver sensor array and thus preferably comprises one or more receiver elements in an array. The active sensor $2a$, $2b$, $2c$, $2d$ may further comprise or be operatively coupled to a light source 6. According to embodiments the active sensor $2a$, $2b$, $2c$, $2d$ and one or more light sources 6 are part of a luminaire. The active sensors $2a$, $2b$, $2c$, $2d$ of the control system 1 may thereby provide presence detection information to a distributed lighting system which may include the one or more light sources 6.

Figure 3:
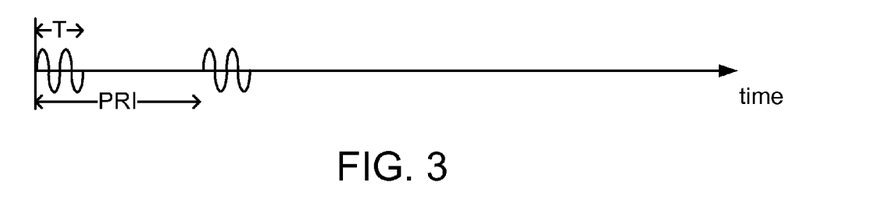
FIG. 3-7 schematically illustrate waveforms of probe signals according to embodiments.

Referring back now to the control system 1, the transmitter 3 of each active sensor $2a$, $2b$, $2c$, $2d$ may be arranged to transmit a waveform (schematically illustrated by arrows 11, $12a$, 13, 14) over an area defined by the directivity of the transmitter 3. It is to be noted that in FIG. 1 only signals received by the active sensor $2b$ are illustrated. FIG. 3 illustrates one example of a transmitted waveform in the form of a probe signal. The parameter T defines a length over which the waveform is non-zero in each pulse repetition interval (PRI) and is chosen as per the spatial resolution required. The PRI is generally chosen to accommodate the largest expected range in time before an echo (such as the echo $12b$) of the transmitted probe signal (such as the probe signal $12a$) is expected to be received by the receiver 4. Furthermore, each active sensor currently deployed in the control system 1 is assigned to a timeslot wherein it is arranged to transmit its probe signal. Such timeslots will be further disclosed below with references to FIGS. 4-7.

The probe signals 11, $12a$, 13, 14 (and any echo $12b$ thereof) are received by the receiver 4 of the active sensor $2a$, $2b$, $2c$, $2d$. At the receiver side, the received signals are then processed, for example in order to derive presence-related sensing information. Each active sensor currently deployed in the control system 1 is assigned to a timeslot wherein it is arranged to receive the echo of its probe signal. Preferably the assigned timeslot for transmitting its own probe signal and the assigned timeslot for receiving the echo thereof is one and the same timeslot. Preferably each active sensor currently deployed in the control system 1 is assigned to a unique timeslot. Preferably the timeslots are adjacent and non-overlapping.

Consider a scenario with four active sensors 2a-d distributed in a room, as in the control system 1 of FIG. 1. During a configuration phase (or when the room is unoccupied), the timeslots may be randomly reassigned for several instances. In one instance, the active sensor 2a (the first active sensor) and the active sensor 2b (the second active sensor) are assigned timeslots TS1 and TS2, respectively. In its assigned timeslot each active sensor is arranged to transmit two consecutive pulses and to listens to the echoes thereof. Particularly, the transmitter 3 of the first active sensor 2a is, in a step S02 as at (i) in FIG. 4, arranged to in a first timeslot TS1 transmit a first probe signal 11, as represented by the waveform illustrated in FIG. 3, over an area defined by the directivity (i.e. field-of-view) of the transmitter 3 of the first active sensor 2a. The first probe signal 11 comprises two non-zero pulses transmitted in respective parts of the first timeslot TS1. The first probe signal 11 is at (ii) in FIG. 4 received by the receiver 4 of the second active sensor 2b, step S04a. The transmitter 3 of the second active sensor 2b may, in a step S06 as at (iii) in FIG. 4, arranged to in a second timeslot TS2 transmit a second probe signal 12a, as represented by the waveform illustrated in FIG. 3, over an area defined by the directivity (i.e. field-of-view) of the transmitter 3 of the second active sensor 2b. The second probe signal 12a comprises two non-zero pulses transmitted in respective parts of the second timeslot TS2. An echo 12b of the second probe signal 12a is at (ii) in FIG. 4 received by the receiver 4 of the second active sensor 2b, step S04b. The processing unit 5 of the second active sensor 2b, in a step S08 as at (iv) in FIG. 4, in the second timeslot TS2 determines a difference between signals received in a first part of the second timeslot and signals received in a second part of the second timeslot TS2. A difference signal is thereby obtained by taking the difference of echo signals corresponding to two PRIs. Subtraction may involve time shift and/or scaling of the signals in the two PRIs. Preferably the first part corresponds to the first half of the second timeslot TS2 and the second part corresponds to the second half of the second timeslot TS2.

Figure 4:
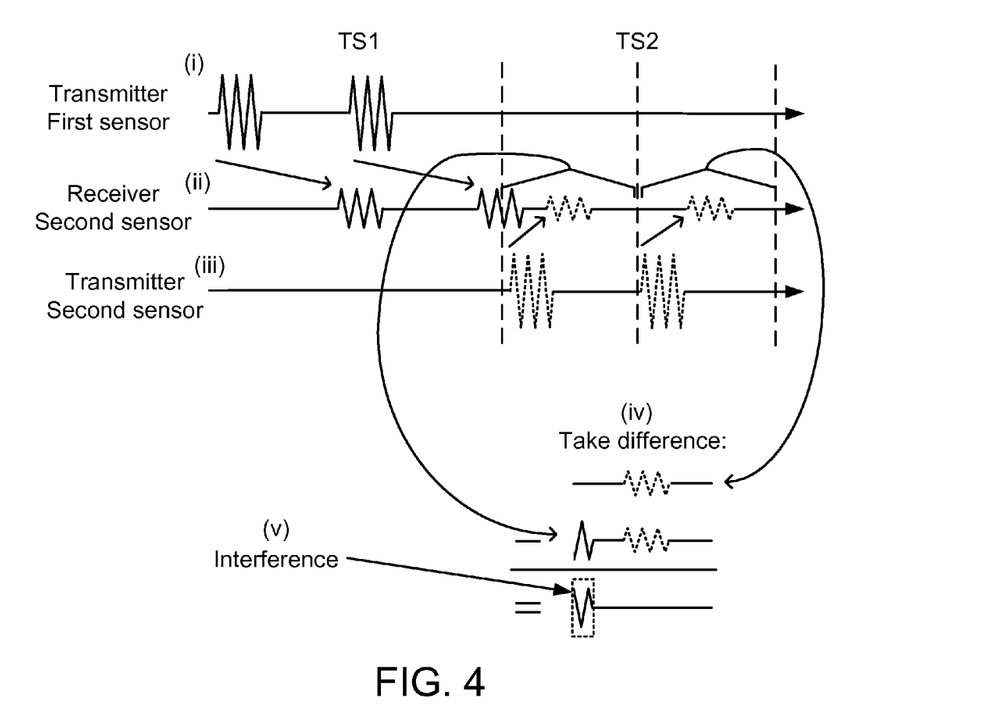

A static object results in a corresponding (almost) zero difference signal component at the related time-of-flight, whereas a moving object results in a non-zero signal component at the related time-of-flight. The power in the difference signal at different time-of-flight windows can thus be used to, by means of the second probe signal 12a and its echo 12b, detect human presence in the room 15. Echoes from static objects (e.g. the object 7) generally result in the same contribution in received signals and so are cancelled out. This is only the case with consecutive pulses transmitted by the same active sensor in the same timeslot; however, if the echoes originate from the transmitted signal in a previous timeslot (which thus is assigned to a neighboring active sensor), there will be an odd number of (or parts of) received signals (including echoes) in one timeslot when the difference at (iv) in FIG. 4 is taken and hence not all received signals will be cancelled out, as at (v) in FIG. 4. The processing unit 5 is thereby arranged to detect interference. Interference may be detected when the difference has an absolute value that is larger than a predetermined threshold. The processing unit 4 may also perform correlation in order to detect interference. The waveform of the first probe signal 11 may then preferably be uncorrelated to the waveform of the second probe signal 12a (and the echo 12b thereof).

Figure 5:
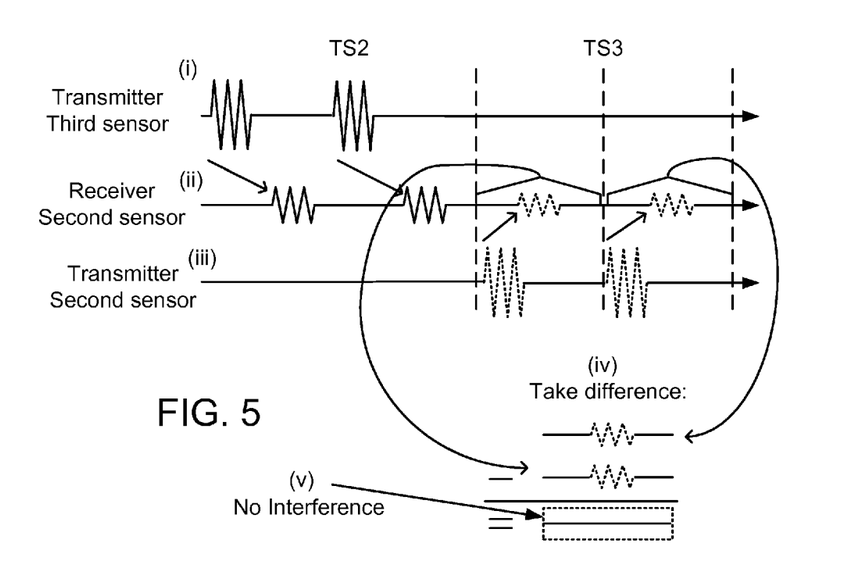

In a next instance, as in FIG. 5, the second active sensor 2b and the third active sensor 2c are assigned timeslots TS3 and TS2, respectively. In this case (see FIG. 1), no object is present between the second active sensor 2b and the third active sensor 2c, so no additional interference originating from the third active sensor 2c to the second active sensor 2b is received, as illustrated in FIG. 5. At (i), the third active sensor 2c in timeslot TS2 transmits a third probe signal 13. At (ii), in timeslot TS2 the second active sensor 2b receives the third probe signal 13. At (iii), in timeslot TS3 the second active sensor 2b transmits a second probe signal 12a. At (ii), in timeslot TS3 the second active sensor 2b receives an echo 12b of the second probe signal 12a. By determining the difference the processing unit 4 is thereby arranged to cancel the two non-zero pulses of the second probe signal by subtracting the non-zero pulse received in the first part of in timeslot TS3 from the non-zero pulse received in the second part of in timeslot TS3 (or vice versa). Hence, after a difference has been taken at (iv) no interference is detected at (v).

In FIG. 4, for the given timeslot assignment, at (v) a high interference is observed at the first part of timeslot TS2, whereas at (v) in FIG. 5, no interference is observed in that same part of timeslot TS2. In this way, the presence of an object between the first active sensor 2a and the second active sensor 2b, which is causing the inference, is determined. Hence, there is a larger cross-interference from the second active sensor 2b to the first active sensor 2a. Using this information the active sensors may discard those parts (ranges) of timeslot TS2 where interference has been detected, set a higher threshold for echo detection (i.e. increase the predetermined threshold) or be re-assigned (thereby reallocated) to timeslots with minimum interference from others active sensors.

Figure 6:
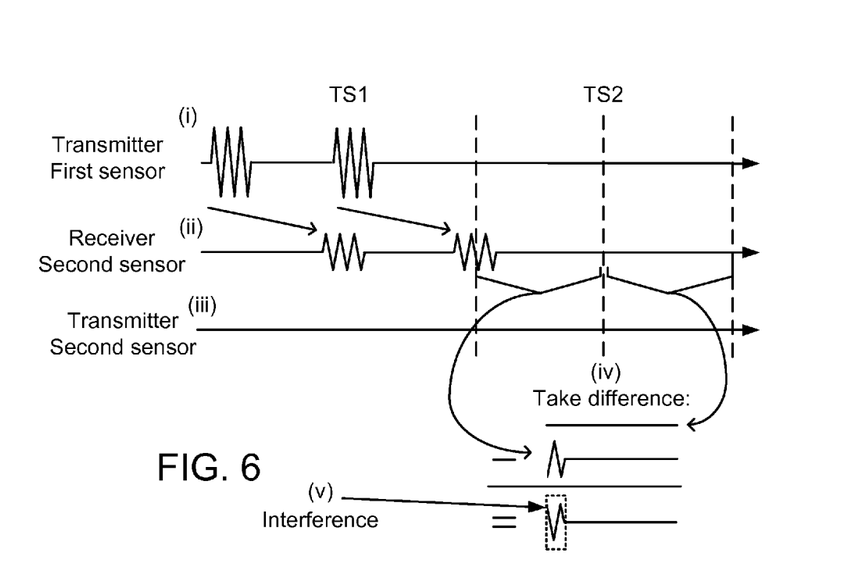

According to another embodiment, instead of using a random reassignment of timeslots, one or more of the active sensors, say the second active sensor 2b, may skip from time to time the transmission of a probe signal in its assigned slot, say timeslot TS2, as shown in FIG. 6. At (i), in timeslot TS1 the first active sensor 2a transmits a first probe signal 11. At (ii), in timeslot TS1 the second active sensor 2b receives (parts of) the first probe signal 11. At (iii), in timeslot TS2 the second active sensor 2b does not transmits any probe signal (i.e., the second active sensor 2b is silent in its allocated timeslot TS2). Given that there is no transmission in timeslot TS2, then no echo should be received at (ii) in timeslot TS2 and hence the difference taken by the processing unit 4 of the second active sensor 2b at (iv) should be zero. Any echo received during timeslot TS2 will thus have originated from a neighbor active sensor, i.e., the first active sensor 2a, and thus be determined by the processing unit 4 of the second active sensor 2b at (v) as interference. This interference knowledge may be used in a similar way as according to the previous embodiment to improve the control system 1. The active sensors 2a, 2b may thus discard those parts (ranges) of timeslot TS2 where interference has been detected, set a higher threshold for echo detection (i.e. increase the predetermined threshold) or be re-assigned (thereby reallocated) to timeslots with minimum interference from others active sensors.

Figure 7:
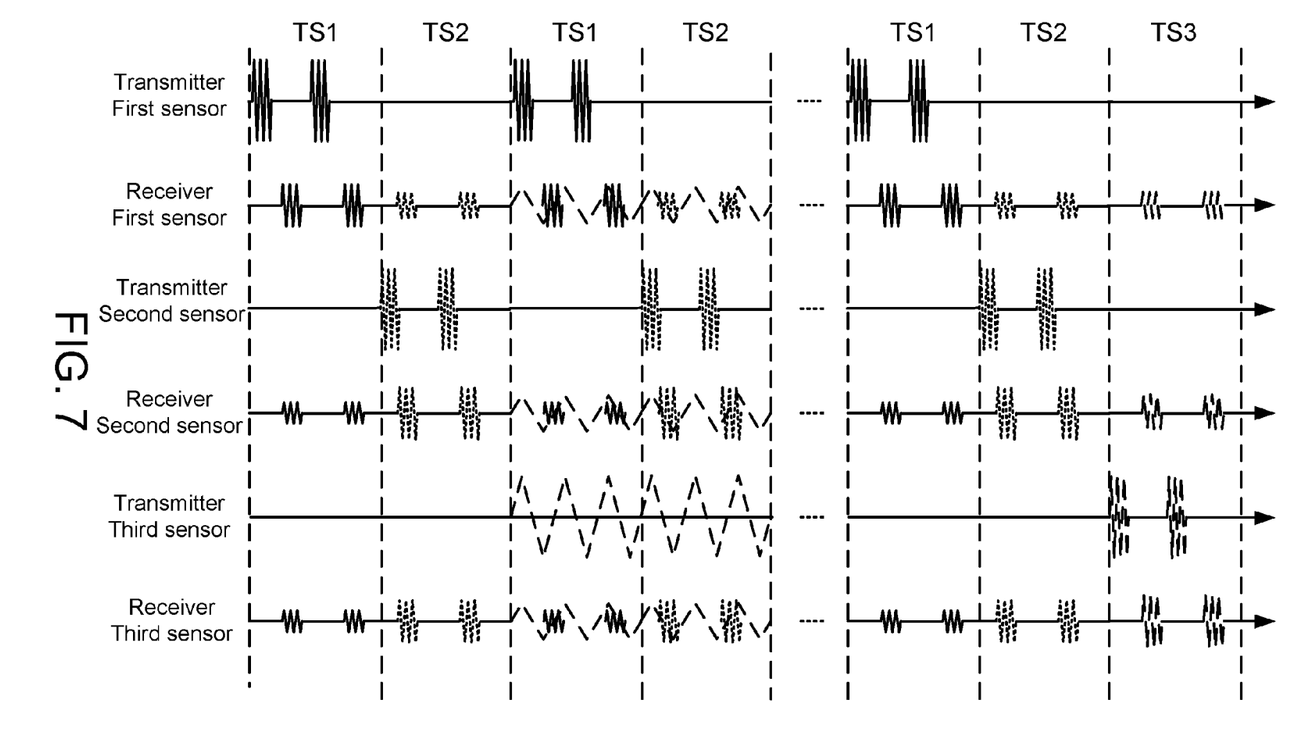
Figure 8:
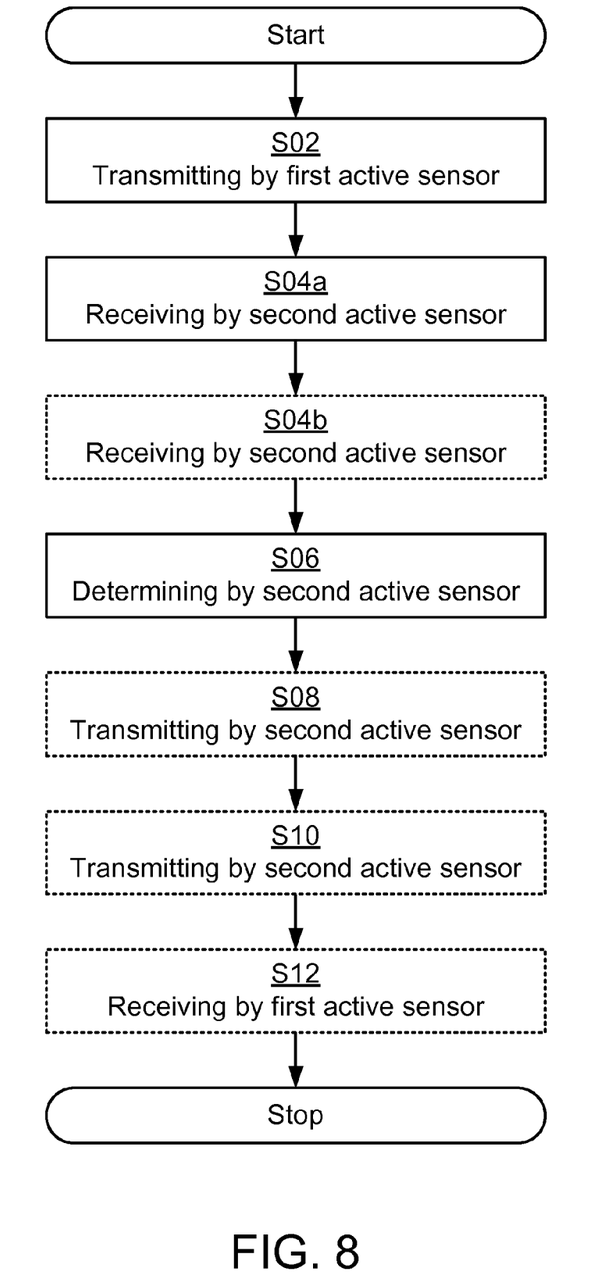
FIG. 8 is a flowchart of a method according to embodiments.

Assume now that the control system 1 comprises the active sensors 2a and 2b (i.e., the first and second active sensors). According to one embodiment, when a new active sensor (say, the active sensor 2c (the third active sensor)) is added to the control system 1 already comprising the active sensors 2a and 2b and the new active sensor 2c detects that all the timeslot are occupied, it may transmit an announcement signal, for example a probe signal in a frequency different from the above disclosed first and second probe signals or a strong continuous sinusoidal signal for a few cycles, which may be one or more whole timeslots, in order to signal the active sensors 2a, 2b currently in the control system 1 that an additional timeslot should be inserted and thus also that the currently assigned timeslots should be reassigned. This process is illustrated in FIG. 7. Specifically, as in FIG. 7, initially the first active sensor 2a is assigned timeslot TS1 and the second active sensor 2b is assigned timeslot TS2. Hence, initially in timeslot TS1 the first active sensor 2a transmits its first probe signal 11 which is received by the second active sensor 2b and the new active sensor 2c and the echo of the first probe signal is received by the first active sensor 2a. Further, initially in timeslot TS2 the second active sensor 2b transmits its second probe signal 12a which is received by the first active sensor 2a and the new active sensor 2c and the echo 12b of the second probe signal is received by the second active sensor 2b. In the second occurrence of timeslot TS1 (and/or timeslot TS2) the new active sensor 2c, in a step S10, transmits an announcement signal pertaining to the third active sensor 2c being added to the control system 1.

Thus, in addition to receiving the first probe signal of the first active sensor 2a also the announcement signal of the new active sensor 2c is received, in a step S12, in timeslot TS1 (and/or in addition to receiving the second probe signal of the second active sensor 2b also the announcement signal of the new active sensor 2c is received in timeslot TS2). The active sensors 2a, 2b currently in the control system 1 would thus detect the announcement signal as interference in all the timeslots (as disclosed above with references to FIGS. 4-6) and would hence realize that a new active sensor 2c is in the process of being added to the control system 1 and thus that a new timeslot is required. A new timeslot TS3 is then added and the timeslots TS1, TS2, TS3 are re-allocated to the active sensor 2a, 2b, 2c in the control system 1. Specifically, as in FIG. 7, after introduction of timeslot TS3 the first active sensor 2a is assigned timeslot TS1, the second active sensor 2b is assigned timeslot TS2, and the newly added third active sensor 2c is assigned timeslot TS3. Thus, in timeslot TS3 the third active sensor 2c transmits its probe signal which is received by the first active sensor 2a and the second active sensor 2b and the echo of the probe signal is received by the third active sensor 2c. Other assignments of the timeslots TS1, TS2, TS3 are equally possible.

Typically the above probe signals and announcement signal have a carrier frequency of approximately 30-50 kHz, preferably 25-45 kHz, even more preferably 40 kHz and a bandwidth of approximately 1-5 kHz, preferably 1-3 kHz, even more preferably 2 kHz. As an example, a commercial off-the-shelf transmitter with a carrier frequency of 40 kHz having a typical bandwidth of 2 kHz may be used.

In summary, there has been disclosed a network of active sensors in a control system. Applications are, for example, active presence sensors in lighting control applications. The active sensors, which may be fixed-infrastructure sensors, provide presence detection information to a distributed lighting system. The active sensors communicate by transmitting probe signals. The communication of probe signals may result in cross-interference which may vary in time. Cross-interference is detected, and can later be avoided, by determining a difference between signals received in a first part of a timeslot and signals received in a second part of the timeslot. In order to do so probe signals comprising two non-zero pulses are transmitted in respective parts of the timeslot. In general the number of non-zero pulses in each probe signal may not be limited to two. Preferably the number of non-zero pulses in each probe signal corresponds to the number of parts that each timeslot is divided into for purposes of detecting interference. Preferably each timeslot is divided into an even number of parts, and thus preferably the number of non-zero pulses in each probe signal is then also even.

The person skilled in the art realizes that the present invention by no means is limited to the preferred embodiments described above. On the contrary, many modifications and variations are possible within the scope of the appended claims. For example, the disclosed embodiments may advantageously be used to improve the performance and facilitate the management of presence sensing for different indoor and outdoor scenarios.

The invention claimed is:

1. A control system, comprising
a first active sensor comprising
a transmitter arranged to in a first timeslot transmit a first probe signal comprising two non-zero pulses transmitted in respective parts of said first timeslot; and
a second active sensor comprising
a receiving sensor array arranged to receive said first probe signal; and
a processing unit arranged to, in a second timeslot, determine a difference between signals received in a first part of said second timeslot and signals received in a second part of said second timeslot, the processing unit thereby being arranged to detect cross-interference between the active sensors, cross-interference being detected if the power in the difference signal has an absolute value that is larger than a predefined threshold value.

2. The control system according to claim 1, wherein the second active sensor further comprises
a transmitter arranged to in said second timeslot transmit a second probe signal comprising two non-zero pulses transmitted in respective parts of said second timeslot, wherein
said receiving sensor array further is arranged to receive an echo of said second probe signal, and wherein
said processing unit, by determine said difference, thereby being arranged to cancel said two non-zero pulses of said second probe signal.

3. The control system according to claim 1, wherein one of said respective parts corresponds to a first half, and wherein the other of said respective parts corresponds to a second half.

4. The control system according to claim 1, wherein interference is detected by said difference having an absolute value being larger than a predetermined threshold.

5. The control system according to claim 4, wherein said processing unit is further arranged to, in response to interference being detected, increase said predetermined threshold.

6. The control system according to claim 1, wherein said processing unit is further arranged to discard ranges in said second timeslot where interference is detected.

7. The control system according to claim 1, wherein said first timeslot and said second timeslot are reallocated in response to interference being detected.

8. The control system according to claim 1, wherein the second active sensor further comprises
a transmitter arranged to in said second timeslot and in response to said receiving sensor array receiving said first probe signal transmit an announcing signal pertaining to said second active sensor being added to the control system, and wherein
the first active sensor further comprises
a receiving sensor array arranged to receive said announcing signal.

9. The control system according to claim 8, wherein said announcing signal is a continuous sinusoidal transmitted in entire said second timeslot.

10. The control system according to claim 8, wherein frequency content of said announcing signal is different from frequency content of said first probe signal.

11. The control system according to claim 1, wherein said receiving sensor array is arranged to perform correlation in order to detect interference.

12. The control system according to claim 2, wherein said first active sensor and said second active sensor are either ultrasound based sensors or radar based sensors.

13. A method of detecting interference in a control system (1), comprising transmitting, by a first active sensor, in a first timeslot a first probe signal comprising two non-zero pulses transmitted in respective parts of said first timeslot;

receiving, by a second active sensor, said first probe signal; and determining, by said second active sensor, in a second timeslot a difference between signals received in a first part of said second timeslot and signals received in a second part of said second timeslot, the second active sensor thereby being arranged to detect cross-interference between the active sensors, cross-interference being detected if the power in the difference signal has an absolute value that is larger than a predefined threshold value.

14. The method according to claim 13, further comprising transmitting, by said second active sensor, in said second timeslot a second probe signal comprising two non-zero pulses transmitted in respective parts of said second timeslot;

receiving, by said second active sensor, an echo of said second probe signal, said second active sensor, by determining said difference, thereby being arranged to cancel said two non-zero pulses of said second probe signal.

15. The method according to claim 13, further comprising transmitting, by said second active sensor, in said second timeslot and in response to said receiving said first probe signal an announcing signal pertaining to said second active sensor being added to the control system, and wherein receiving, by said first active sensor, said announcing signal.

* * * * *